US011969699B2

(12) United States Patent
Waisman et al.

(10) Patent No.: US 11,969,699 B2
(45) Date of Patent: Apr. 30, 2024

(54) CARBONATION MACHINE WITH INTEGRATED WATER TREATMENT AND DETACHABLE WATER RESERVOIR

(71) Applicant: Sodastream Industries Ltd., Kfar Saba (IL)

(72) Inventors: Alon Waisman, Shoham (IL); Vadislav Gur, Modi'in (IL); Avi Cohen, Tel Aviv (IL); Allan Ring, Mercaz Shapira (IL)

(73) Assignee: Sodastream Industries Ltd., Kfar Saba (IL)

( * ) Notice: Subject to any disclaimer, the term of this patent is extended or adjusted under 35 U.S.C. 154(b) by 0 days.

(21) Appl. No.: 17/693,410

(22) Filed: Mar. 13, 2022

(65) Prior Publication Data

US 2023/0285912 A1 Sep. 14, 2023

(51) Int. Cl.

| | |
|---|---|
| ***B01F 23/23*** | (2022.01) |
| ***B01F 23/2361*** | (2022.01) |
| ***B01F 23/237*** | (2022.01) |
| ***B01F 23/70*** | (2022.01) |
| ***B01F 35/21*** | (2022.01) |
| ***B01F 35/71*** | (2022.01) |

(52) U.S. Cl.

CPC .................. *B01F 23/23611* (2022.01); *B01F 23/237621* (2022.01); *B01F 23/708* (2022.01); *B01F 23/712* (2022.01); *B01F 35/2111* (2022.01); *B01F 35/7176* (2022.01)

(58) Field of Classification Search

CPC ........ B01F 23/23611; B01F 23/237621; B01F 23/708; B01F 23/712; B01F 35/2111; B01F 35/7176

See application file for complete search history.

(56) References Cited

U.S. PATENT DOCUMENTS

| | | | | |
|---|---|---|---|---|
| 5,139,708 A * | 8/1992 | Scott | .................... | B67D 1/0068 222/64 |
| 5,870,944 A * | 2/1999 | Vander Zalm | ...... | B01F 23/2361 261/DIG. 7 |
| 2009/0261485 A1* | 10/2009 | Eklund | ................ | B67D 1/0009 261/22 |

(Continued)

FOREIGN PATENT DOCUMENTS

| | | | |
|---|---|---|---|
| CN | 205625634 U * | 10/2016 | |
| CN | 107716476 A * | 2/2018 | ............... B08B 3/08 |

(Continued)

*Primary Examiner* — Stephen Hobson

(74) *Attorney, Agent, or Firm* — PEARL COHEN ZEDEK LATZER BARATZ LLP

(57) ABSTRACT

A carbonation machine with integrated water treatment. The carbonation machine may include a carbonation system for carbonating water in a bottle attached to a carbonation head of the system, a detachable water reservoir, configured to be mounted on a base with an outlet port to allow outward flow of water from the reservoir, piping connecting the outlet port of the water reservoir to transfer water from the detachable reservoir and to pour the water into the bottle, a pump for pumping water out of the water reservoir and transfer the pumped water via the piping, a controller configured to control the pump, and one or more water treatment components fluidically connected to the piping to apply water treatment to water flowing through the piping.

22 Claims, 10 Drawing Sheets

(56) References Cited

U.S. PATENT DOCUMENTS

| | | | | |
|---|---|---|---|---|
| 2013/0029016 | A1 | 1/2013 | Gottenbos et al. | |
| 2015/0024088 | A1* | 1/2015 | Cohen | B01F 23/2362 261/28 |
| 2015/0037464 | A1* | 2/2015 | McHale | B67D 1/0059 426/67 |
| 2015/0225221 | A1* | 8/2015 | Wilder | B01F 23/2362 426/477 |
| 2016/0016129 | A1* | 1/2016 | Vermeulen | B01F 23/2362 261/138 |
| 2016/0106136 | A1* | 4/2016 | Gordon | F28D 1/06 426/477 |
| 2017/0000164 | A1* | 1/2017 | Marchal | A23L 33/16 |
| 2017/0120203 | A1* | 5/2017 | Novak | B01F 23/23611 |
| 2017/0297891 | A1* | 10/2017 | Ko | B67D 1/0855 |
| 2018/0057338 | A1* | 3/2018 | Baysal | B01F 35/7176 |
| 2018/0236414 | A1* | 8/2018 | Rudick | B01F 23/2362 |
| 2018/0327246 | A1* | 11/2018 | Bamford | B67D 1/0057 |
| 2019/0160438 | A1* | 5/2019 | Knoll | B01F 23/2362 |
| 2019/0291062 | A1* | 9/2019 | Wood | A47J 31/4492 |
| 2019/0291063 | A1* | 9/2019 | Gao | B01F 23/2362 |
| 2019/0291064 | A1* | 9/2019 | Conroy | B67D 1/0071 |
| 2019/0328170 | A1* | 10/2019 | Cai | A47J 31/407 |
| 2020/0146500 | A1* | 5/2020 | Cafaro | B67D 1/0801 |
| 2020/0360875 | A1* | 11/2020 | Danieli | B65D 83/60 |
| 2021/0179983 | A1* | 6/2021 | Osborn | B01F 35/2113 |
| 2021/0283558 | A1* | 9/2021 | Yang | B01F 23/2363 |
| 2022/0387942 | A1* | 12/2022 | Shalev | B01F 23/23122 |
| 2022/0402742 | A1* | 12/2022 | Pittaway | B67D 1/10 |

FOREIGN PATENT DOCUMENTS

| | | | | | |
|---|---|---|---|---|---|
| CN | 105486000 | B | * | 5/2018 | A23L 2/42 |
| CN | 111744264 | A | * | 10/2020 | |
| CN | 111954470 | A | * | 11/2020 | A23L 2/54 |
| DE | 19742301 | A1 | * | 11/1998 | A23L 2/54 |
| JP | 2016125739 | A | * | 7/2016 | B01F 3/0407 |
| KR | 101619747 | | | 5/2016 | |
| KR | 100903038 | | | 6/2019 | |
| WO | WO-2018064451 | A1 | * | 4/2018 | B67D 1/0031 |
| WO | WO-2018089460 | A1 | * | 5/2018 | A23L 2/40 |
| WO | WO-2022039546 | A1 | * | 2/2022 | |

* cited by examiner

CARBONATION MACHINE WITH INTEGRATED WATER TREATMENT AND DETACHABLE WATER RESERVOIR

FIELD OF THE INVENTION

The present invention relates to carbonation machines, and particularly to a carbonation machine with integrated water treatment and a detachable water reservoir.

BACKGROUND OF THE INVENTION

Carbonation machines are commonly used in homes, offices, cafeterias, and other settings. A typical carbonation machine may be operated to inject carbon dioxide into water or another liquid that is in a bottle that may be attached to the machine. Other types of carbonation machines may be configured to dispense carbonated beverages into cups or other containers.

Typically, a user of a carbonation machine fills the bottle that is to be attached to the carbonation machine with water (some users prefer cold water) up to a recommended water level and then attaches the water filled bottle to the carbonation head of the carbonation machine Water may contain various kinds of contaminants—physical contaminants, such as, sediment, organic matter (e.g., suspended in the water), chemical contaminants, (e.g., compounds or compositions of matter), biological contaminants (e.g., organisms) and even radiological contaminants (e.g., unstable atoms emitting ionizing radiation).

Water treatments may be aimed at removing contaminants by using a filtering medium acting to serve as a physical barrier and/or perform chemical and/or biological process.

There are various types of water filters, such as, water pitcher filters, faucet filters, countertop filters, under-sink filters, whole house filters and reverse-osmosis filtering systems.

It may be desired to have a carbonation machine with water treatment and with an integrated detachable water reservoir, that can allow the user to fill the reservoir with tap water, place the reservoir in a refrigerator, and when it is desired to have a carbonated drink prepared, attach the reservoir to its designated place and use the cooled water in preparing the carbonated drink.

SUMMARY OF THE INVENTION

There is thus provided, in accordance with an embodiment of the invention, a carbonation machine with integrated water treatment. The carbonation machine may include a carbonation system for carbonating water in a bottle attached to a carbonation head of the system. The carbonation machine may also include a detachable water reservoir, configured to be mounted on a base with an outlet port to allow outward flow of water from the reservoir. The carbonation machine may also include piping connecting the outlet port of the water reservoir to transfer water from the detachable reservoir and to pour the water into the bottle. The carbonation machine may also include a pump for pumping water out of the water reservoir and transfer the pumped water via the piping. The carbonation machine may also include a controller configured to control the pump. The carbonation machine may also include one or more water treatment components fluidically connected to the piping to apply water treatment to water flowing through the piping.

According to some embodiments of the invention, the piping is located within a housing with the carbonation system.

According to some embodiments of the invention, the one or more water treatment components may be selected from the group consisting of: a filter and a UV LED.

According to some embodiments of the invention, the carbonation machine further includes one or more valves located on the piping, that may be adjusted between a first position in which stagnant water within the piping is diverted via a water return conduit and evacuated, and a second position in which water from the water reservoir is transported via the piping into the bottle. According to some embodiments of the invention, the controller is configured to switch said one or more valves between the first position and the second when a condition is met.

According to some embodiments of the present invention, said one or more valves is configured, when in the first position, to divert the stagnant water into a separate water collector.

According to some embodiments of the present invention, said one or more valves is configured, when in the first position to divert the stagnant water back into the water reservoir.

According to some embodiments of the present invention, the water reservoir comprises an upper compartment into which the stagnant water is diverted to, and a drain for draining water from the upper compartment down into a tank of the water reservoir.

According to some embodiments of the present invention, the upper compartment comprises a main filling passage to pour water directly into the tank, and a peripheral container into which the stagnant water is diverted to, the peripheral container including the drain.

According to some embodiments of the present invention, the drain comprises one or more pinholes.

According to some embodiments of the present invention, an overall area of the drain is not greater than 20 $mm^2$, wherein said one or more pinholes comprises one pinhole having a diameter of up to 5 mm, or several pinholes with matched diameters.

According to some embodiments of the present invention, an overall area of the drain is not greater than 10 $mm^2$, wherein said one or more pinholes comprises one pinhole having a diameter of up to 3.6 mm, or several pinholes with matched diameters.

According to some embodiments of the present invention, a filling opening of the upper compartment substantially overlap only the main filling passage.

According to some embodiments of the present invention, the base comprises an inlet port through which the diverted water is transported.

According to some embodiments of the present invention, an outlet check valve is provided at an outlet of the water reservoir, configured to be closed as a default and to be opened when the water reservoir is placed on the base.

According to some embodiments of the present invention, an inlet check valve is provided at an inlet of the water reservoir, configured to be closed as a default and to be opened when the water reservoir is placed on the base.

According to some embodiments of the present invention, the carbonation machine further includes a floating spill outlet configured to spill returned stagnant water over a surface of water inside the water reservoir.

According to some embodiments of the present invention, the carbonation machine further includes a thermal separator for placing over the surface of the water inside the water reservoir.

According to some embodiments of the present invention, the thermal separator is made of a thermally insulating material.

According to some embodiments of the present invention, the carbonation machine further comprises a flow meter along the piping.

According to some embodiments of the present invention, the carbonation system comprises a carbonation head to which the bottle is to be attached.

According to some embodiments of the present invention, the carbonation head comprises a mount for attaching the bottle.

According to some embodiments of the present invention, the carbonation head comprises a tube for transferring carbonation gas into the bottle.

According to some embodiments of the present invention, the carbonation system comprises a gas canister holder, for holding a gas canister and carbonation piping for transporting carbonating gas form the gas canister into the bottle.

BRIEF DESCRIPTION OF THE DRAWINGS

In order for the present invention to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1:
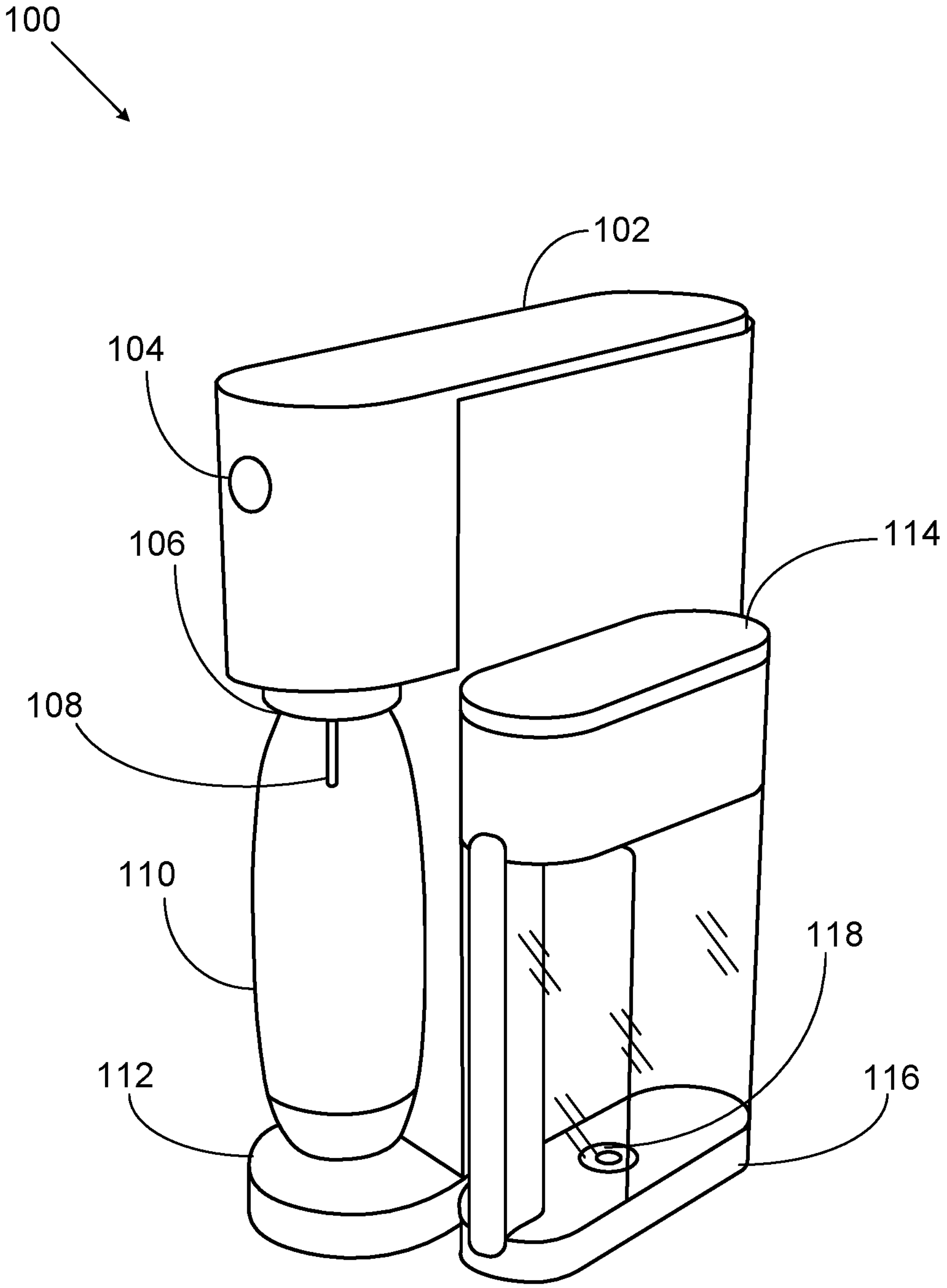
FIG. 1 is a general view of a carbonation machine with an integrated, detachable water reservoir, according to some embodiments of the present invention, in an engaged state.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, “processing,” “computing,” “calculating,” “determining,” “establishing”, “analyzing”, “checking”, or the like, may refer to operation(s) and/or process(es) of a computer, a computing platform, a computing system, or other electronic computing device, that manipulates and/or transforms data represented as physical (e.g., electronic) quantities within the computer’s registers and/or memories into other data similarly represented as physical quantities within the computer’s registers and/or memories or other information non-transitory storage medium (e.g., a memory) that may store instructions to perform operations and/or processes. Although embodiments of the invention are not limited in this regard, the terms “plurality” and “a plurality” as used herein may include, for example, “multiple” or “two or more”. The terms “plurality” or “a plurality” may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction “or” as used herein is to be understood as inclusive (any or all of the stated options).

A carbonation machine with integrated water treatment and an integrated, detachable water reservoir, according to some embodiments of the present invention, is designed to offer a detachable water reservoir in the form of a water reservoir that may be engaged to the carbonation machine so as to provide water that may be pumped through one or more water treatment components into a carbonation bottle and carbonated by the carbonation machine.

The water reservoir may be filled, for example, with tap water, cooled or at room temperature, and may be retained in a cooler, or in a refrigerator, until it is desired to prepare a carbonated drink, such as sparkling water or soda. When a user wants to prepare a carbonated drink, the reservoir may be taken out from the cooler or refrigerator, and mounted on its designated base, so as to be engaged with the carbonation machine, such that water may be pumped out from the reservoir through said one or more water treatment components and dispensed into a bottle that is attached to the carbonation head of the carbonation. Then the carbonation machine may be operated to inject carbon dioxide into the bottle, into or above the water contained in that bottle, to carbonate the water. After the carbonation process ends, the bottle may be disengaged from the carbonation head of the carbonation machine and the carbonated water may be poured into a glass or glasses or otherwise consumed.

A carbonation machine, according to some embodiments of the invention, may include integral one or more water treatment components, so that water driven from the water reservoir through the carbonation machine into the bottle may undergo treatment (e.g., filtering, UV treatment, etc.) as it passes within the carbonation machine.

According to some embodiments of the present invention, a flow scheme of a carbonation machine with integrated water treatment and an integrated, detachable water reservoir, according to some embodiments of the present invention, may be applied to replace water present in the piping of the carbonation machine, that may have warmed up and is warmer than the cooler water in the reservoir with cooled water from the reservoir, so that the warmer water is not used for carbonation, and is diverted back into an upper compartment of the reservoir, allowing only cooler water to be poured into a bottle attached to the carbonation machine so as to make sure that only cooled water is treated and carbonated as desired.

The above mentioned and more features and advantages of some embodiments of the present invention are described with reference to the figures.

FIG. 1 is a general view of a carbonation machine 100 with an integrated, detachable water reservoir 114, according to some embodiments of the present invention, in an engaged state. Carbonation machine 100 typically includes a housing 102 that houses water treatment components and a carbonation mechanism configured, when activated (e.g., by depressing operating button 104), to allow carbonating gas (typically carbon-dioxide) to be discharged from a gas canister, and to flow through designated carbonation piping to be injected out of a carbonation tube 108 into a bottle 110, that contains liquid (typically water) to carbonate that liquid.

Juxtaposed to housing 102 is water reservoir connector, e.g., water reservoir base 116 that may extend from base 112, on which water reservoir 114 may be mounted. Water reservoir 114 may be provided, e.g., at the bottom, with an inlet port (not shown in this figure, see 120 in FIG. 2) and an outlet port 118.

Figure 2:
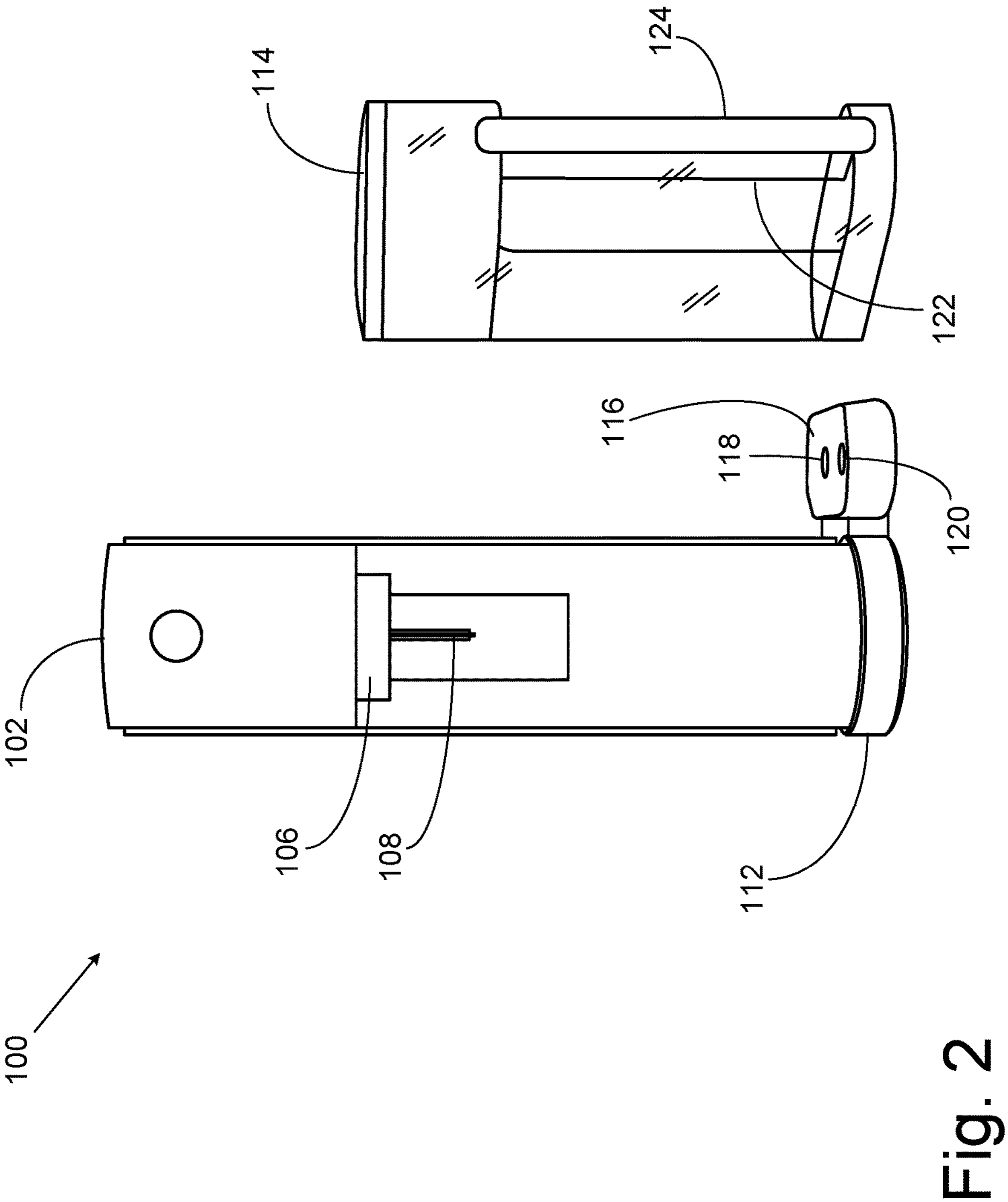
FIG. 2 is a general view of a carbonation machine with an integrated, detachable water reservoir, according to some embodiments of the present invention, in a disengaged state.

FIG. 2 is a general view of a carbonation machine with integrated water treatment and an integrated, detachable water reservoir, according to some embodiments of the present invention, in a disengaged state, with the water reservoir 114 placed beside the carbonation machine 100. Reservoir 114 may include a handle 124 for holding the reservoir, that may be linked to pillar clip 122, in which a water return conduit may be located (this is explained hereinafter in greater detail). Outlet port 118 and inlet port 120 are visible on reservoir base 116. Corresponding check valves 118*a* and 120*a*, respectively, are provided at the bottom of reservoir 114 (see FIG. 7), to allow flow through outlet port 118 and inlet port 120, only when reservoir 114 is properly mounted over reservoir base 116, and prevent flow via these ports in other times. When properly mounted over base 116, check valves 118*a* and 120 *a*, which are closed as a default (e.g., by a spring pressing the check valve to maintain a closed position), are forced to open (e.g., by a projection at the port that forces the check valve open, acting against the spring).

Figure 3:
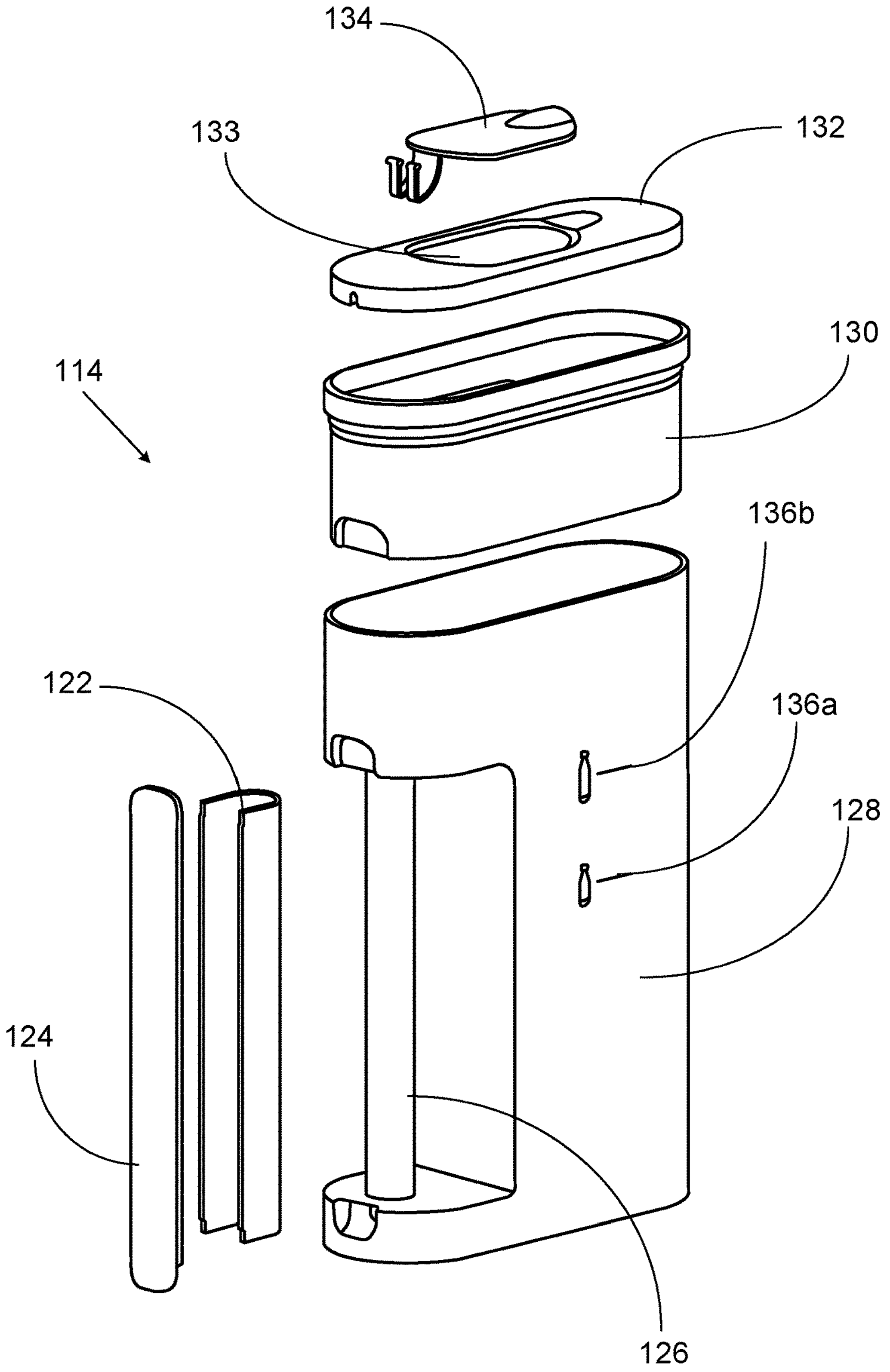
FIG. 3 is an exploded view of a water reservoir, according to some embodiments of the present invention.

FIG. 3 is an exploded view of a water reservoir 114, according to some embodiments of the present invention. Water reservoir 114 may include water tank 128 for receiving and retaining water. Level indicators 136*a* and 136*b* may be provided on a visible part of the side wall of water tank 128, to indicate for the user how much water is needed for a small bottle or a large bottle, respectively. Upper compartment 130 may be provided, configured to fit into and remain at the upper part of water tank 128, and including a drain (not shown in this figure, see 131, FIG. 7), to allow water in upper compartment 130 to drip down, or otherwise flow, into water tank 128.

Upper compartment 130 may include cover 132 that is configured to cover the top of upper compartment 130. Cover 132 may include filling lid 134, configured to rotate between an open position, uncovering a filling opening 133, in which water may be poured into tank 128, and closed position, when filling lid 134 covers the filling opening 133.

Figure 4A:
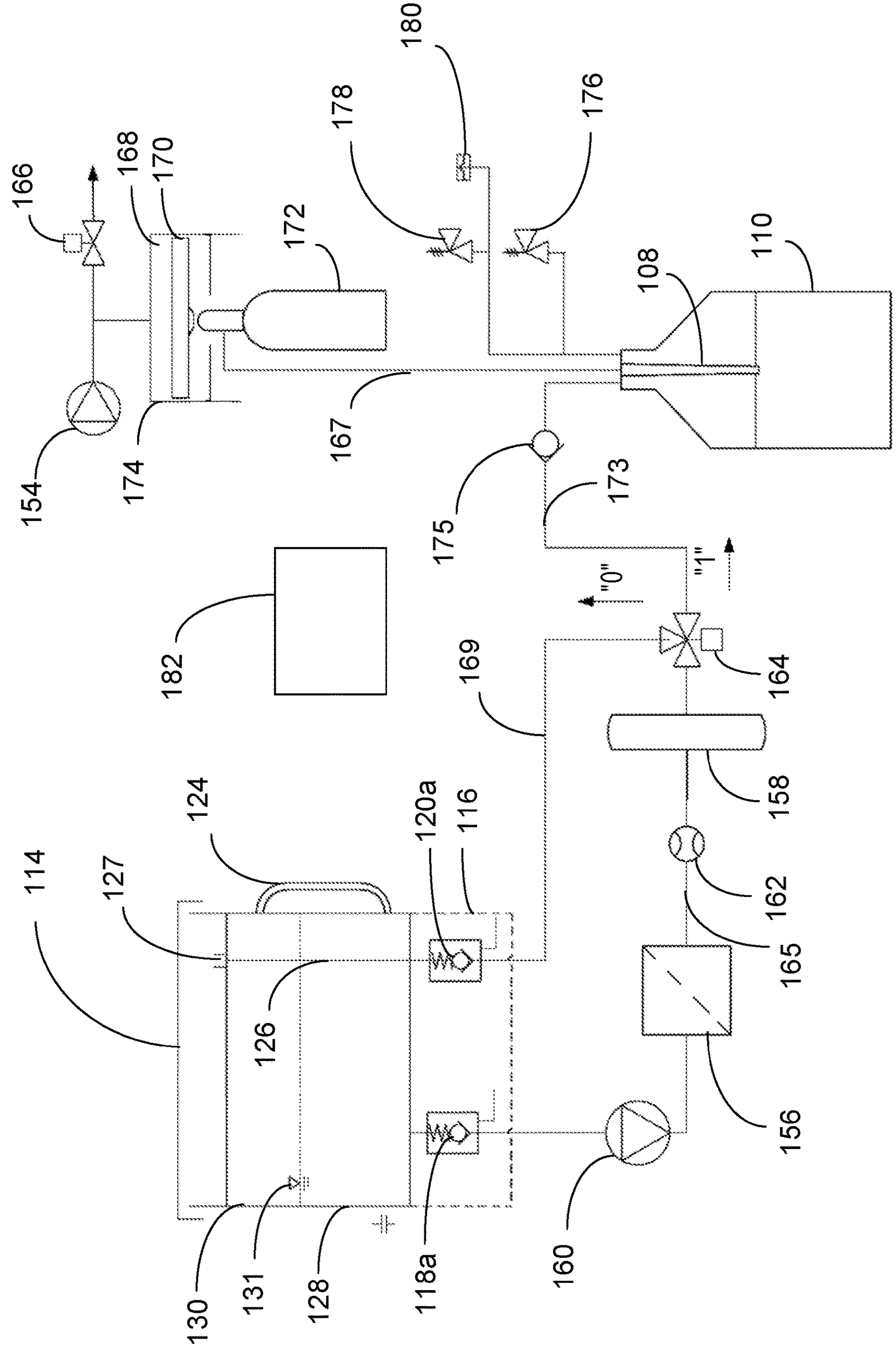
FIG. 4A is a hydraulic schematic of a carbonation machine with integrated water treatment and an integrated, detachable water reservoir, according to some embodiments of the present invention.

FIG. 4A is a hydraulic scheme of a carbonation machine with an integrated, detachable water reservoir, according to some embodiments of the present invention.

Other than reservoir 114, bottle 110 and gas canister 172, all elements shown in FIG. 4A are parts of the carbonation machine.

When filling lid 134 (see FIG. 3) is opened, water may be poured into the reservoir through an opening in the upper compartment 130 into tank 128.

Initially, reservoir 114 may initially be filled with cooled water or filled with tap water and placed in a cooler or a refrigerator to cool the water. When it is desired to carbonate water, the user may place the reservoir with the cooled water on reservoir base 116. When properly placed on reservoir base 116, check valves 118*a* and 120*a* are forced to be open. This may be facilitated, for example, by using a spring to maintain the check valves in a closed position, until the reservoir is properly placed on base 116 at which time a projection of ports 118 and 120 forces check-valves 118*a* and 120*a*, respectively, open. When the reservoir is not properly mounted on reservoir base 116, check valves 118*a* and 120*a* remain closed.

When the user activates the carbonation machine, for example by depressing an operating button (see button 104, FIG. 1), water pump 160 may cause water from tank 128 of reservoir 114 to flow out of tank 128 through check valve 118*a*. The pumped water may be passed through filter 156 to filter out contaminants from the water, and then may be subjected to ultraviolet (UV) radiation (e.g., UV-c) from UV light-emitting diode (LED) 158. A three-way valve 164 may be adjusted to be initially set (e.g., position "0") to allow water passing through that valve that are supposedly stagnant water that was withheld within water piping 165 (water piping 165 may include tubing and various components e.g., pump, flow meter, valves, water treatment components, that are fluidically connected, e.g., from outlet 118 to three-way valve 164) to be diverted to upper compartment 130, through return piping 169, inlet port 120 and water return conduit 126 of reservoir 114, into upper compartment 130. In an alternative design, the three-way valve may be relaced by two separate valves—one valve controlling the flow of returned stagnant water to the upper compartment of the reservoir 114 and the other valve controlling the flow of cooled water form reservoir 114 through water piping 165 via control valve 175 and bottle piping 173 into bottle 110.

Flow meter 162 may be provided to determine the volume of water passing through water piping 165 of the carbonation machine, and may be used for monitoring and controlling sufficient filtration and UV treatment, for feedback to identify leakage and/or clogged filter, to identify improper function or positioning of the filter, and/or identify problems and/or malfunction of the pump.

Controller 182 may be configured to determine whether the stagnant water has been fully evacuated from water piping 165. This may be achieved, for example, by employing a timer and timing a predetermined time duration during which the stagnant water should have been fully evacuated, and/or by employing a flow meter to measure/calculate the volume of water that passed out of the reservoir.

When the controller 182 determines that the stagnant water has been fully evacuated and diverted back into the reservoir, three-way valve 164 may be regulated (e.g., to position "1") to allow water from reservoir 114 to flow through water piping 165 via control valve 175 and bottle piping 173 into bottle 110.

When controller 182 determines that a predetermined amount of water was poured into the bottle, gas canister actuator 174 may operate a valve of gas canister 172, for example by applying mechanical pressure on the valve by piston 170, operated pneumatically (e.g., using air-pump 154 and pressure release valve 166) using compressed air 168. When the valve of gas canister 172 is opened, carbon dioxide from the gas canister flows through carbonation piping 167 and through carbonation tube 108 into bottle 110 to carbonate the water inside bottle 110. The bottle with the carbonated water may then be disengaged and removed from the carbonation machine, and the carbonated water may be consumed. One or more safety measures to prevent excess pressure from building up within the machine may be provided, such as, for example, one or two pressure release valves 176,178, and/or burst disk 180, which are designed to vent out excess pressure, if needed.

Controller 182 may be used to obtain data from sensor/s (e.g., flow meter 162) and to control the operation of adjustable/regulated and/or operable components of the carbonation machine.

Figure 4B:
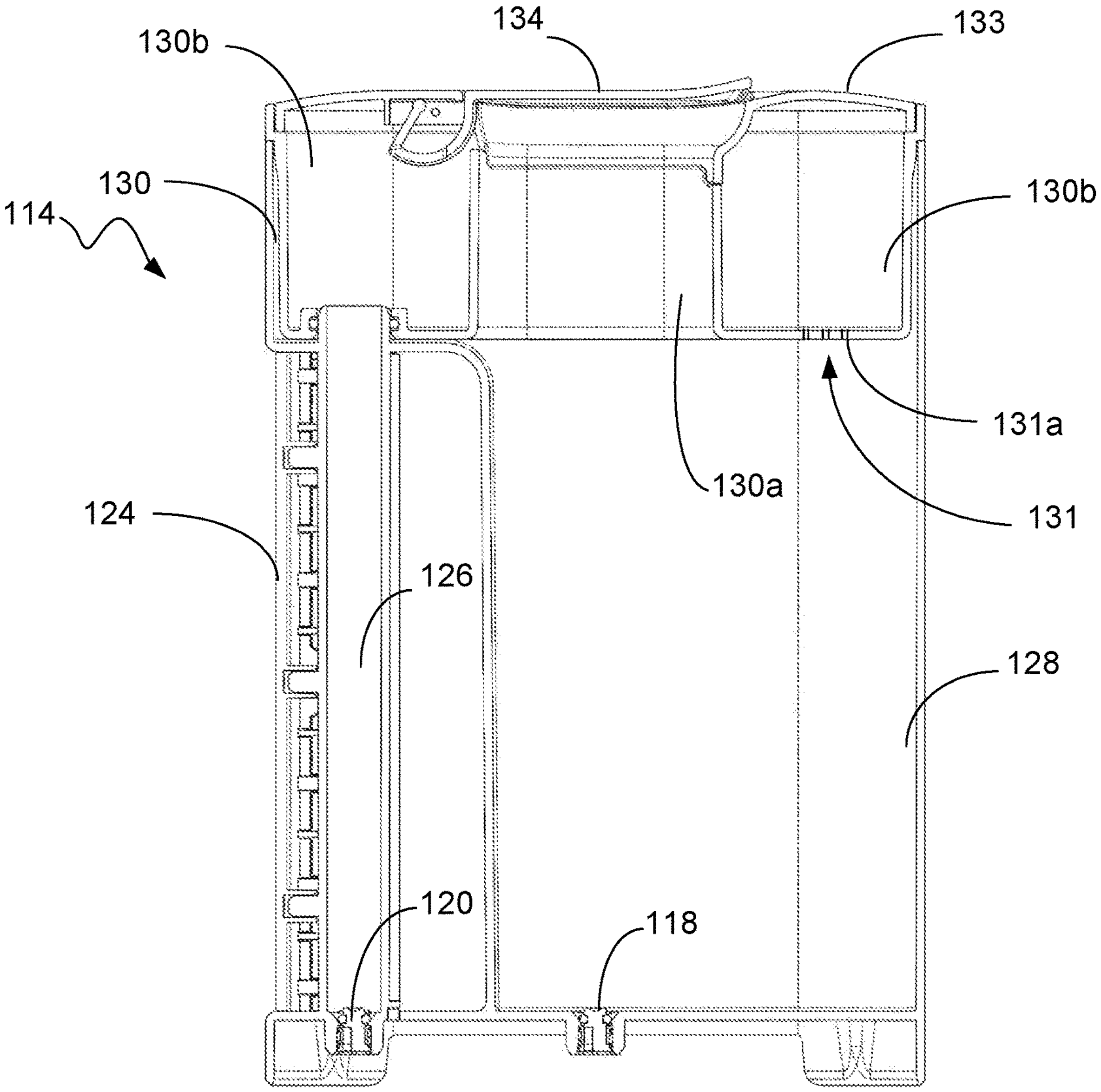
FIG. 4B is a cross-sectional view of the detachable water reservoir of a carbonation machine with integrated water treatment and an integrated, detachable water reservoir, according to some embodiments of the present invention, according to some embodiments of the present invention.

FIG. 4B is a cross-sectional view of a water reservoir 114, according to some embodiments of the present invention.

Upper compartment 130 may include a main filling passage 130*a*, e.g., a conduit (for example, a tube) positioned underneath lid 134, so that when the lid is opened water (e.g., tap water) may be poured into reservoir 114 and flow through main filling passage 130*a* directly into tank 128.

Filling passage 130*a* may be at least partially surrounded by peripheral container 130*b*, that includes drain 131 (e.g., comprising pinholes 131*a*). Thus, returned stagnant water that flows into upper compartment 130 through water return conduit 126 is collected in the peripheral container 130*b* and allowed to slowly drip into tank 128 via the pinholes 131*a* of drain 131. Filling passage 130*a* and peripheral container 130*b* may be separated by the wall of filling passage 130*a*, from the bottom of upper container 130 and up to at least a predetermined height above the bottom of the upper compartment so as to ensure that the returned stagnant water will only drip back to tank 128 via drain 131.

In some embodiments of the present invention, the overall area of drain 131 may be not greater than 20 $mm^2$, with a single pinhole, whose diameter is 5 mm, or with several pinholes with matched surface area. In some embodiments of the present invention, the overall area of drain 131 may range up to 10 $mm^2$, with a single pinhole, whose diameter is 3.6 mm, or with several pinholes with matched diameters.

Lid 134 and filling opening 133 may be configured to substantially overlap only the main filling passage 130*a*, to ensure that water poured through filling opening 133 flows through main filling passage directly into tank 128, without any water residue remaining in the peripheral container 130*b*.

In some embodiments of the present invention, the internal volume of water tank 128 is designed to at least fully contain the content of bottle 110 when full. In some embodiments of the present invention, the upper compartment 130 is designed so as to contain at least the entire stagnant water content of water piping 165, between check valve 118*a* and three-way valve 164.

Figure 4C:
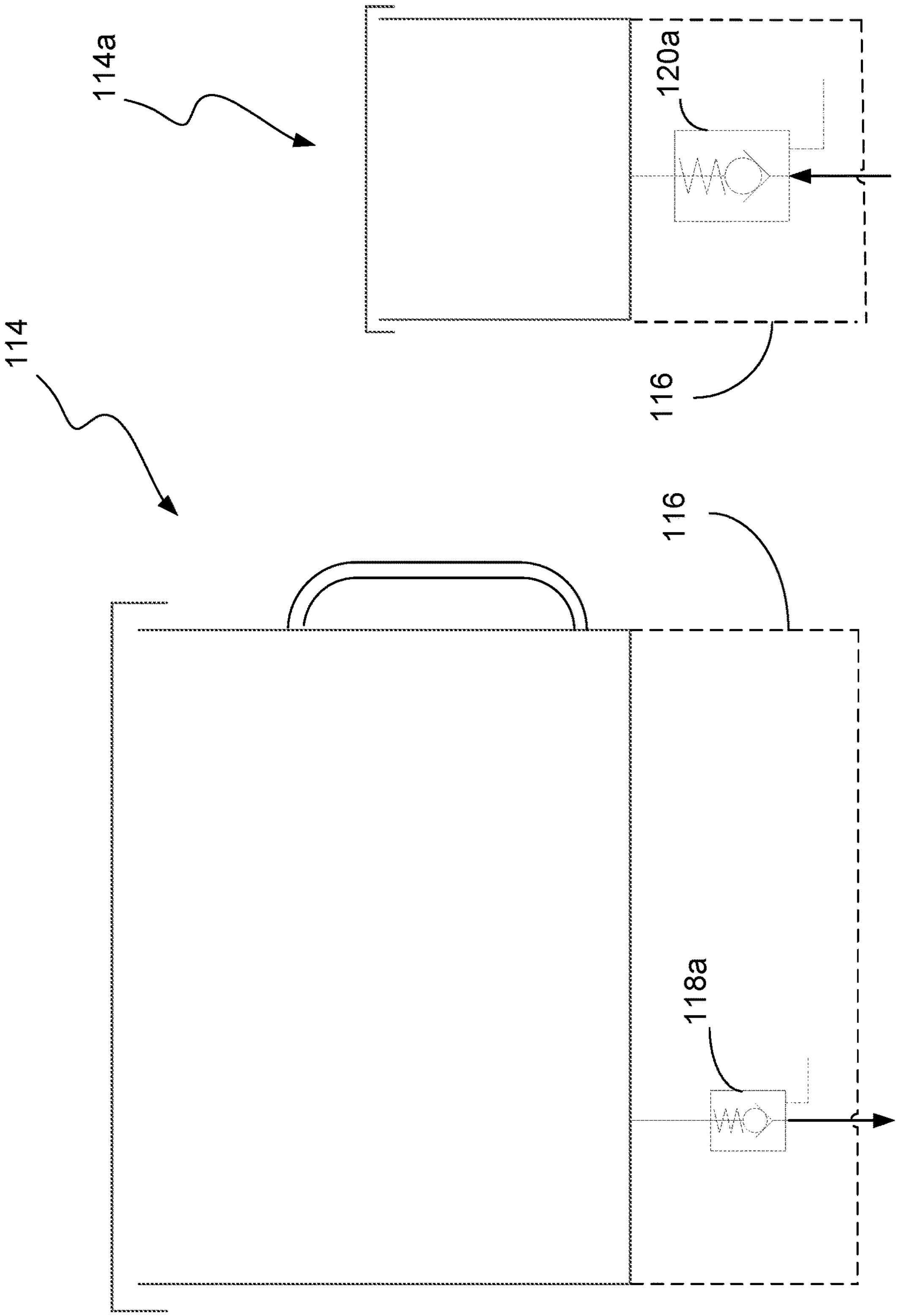
FIG. 4C is a schematic view of the detachable water reservoir and of a separate returned water collector, of a carbonation machine with integrated water treatment and an integrated, detachable water reservoir, according to some embodiments of the present invention.

FIG. 4C is a schematic view of the detachable water reservoir and of a separate returned water collector, of a carbonation machine with integrated water treatment and an integrated, detachable water reservoir, according to some embodiments of the present invention.

In this embodiment the returned stagnant water is diverted via check valve 120*a* to a separate returned water collector 114*a*, to altogether avoid mixing of the stagnant water with the cooled water in the water reservoir 114. The returned water collector 114*a* may be detachable and thus can be removed from reservoir base 116 and emptied when this is needed.

Figure 4D:
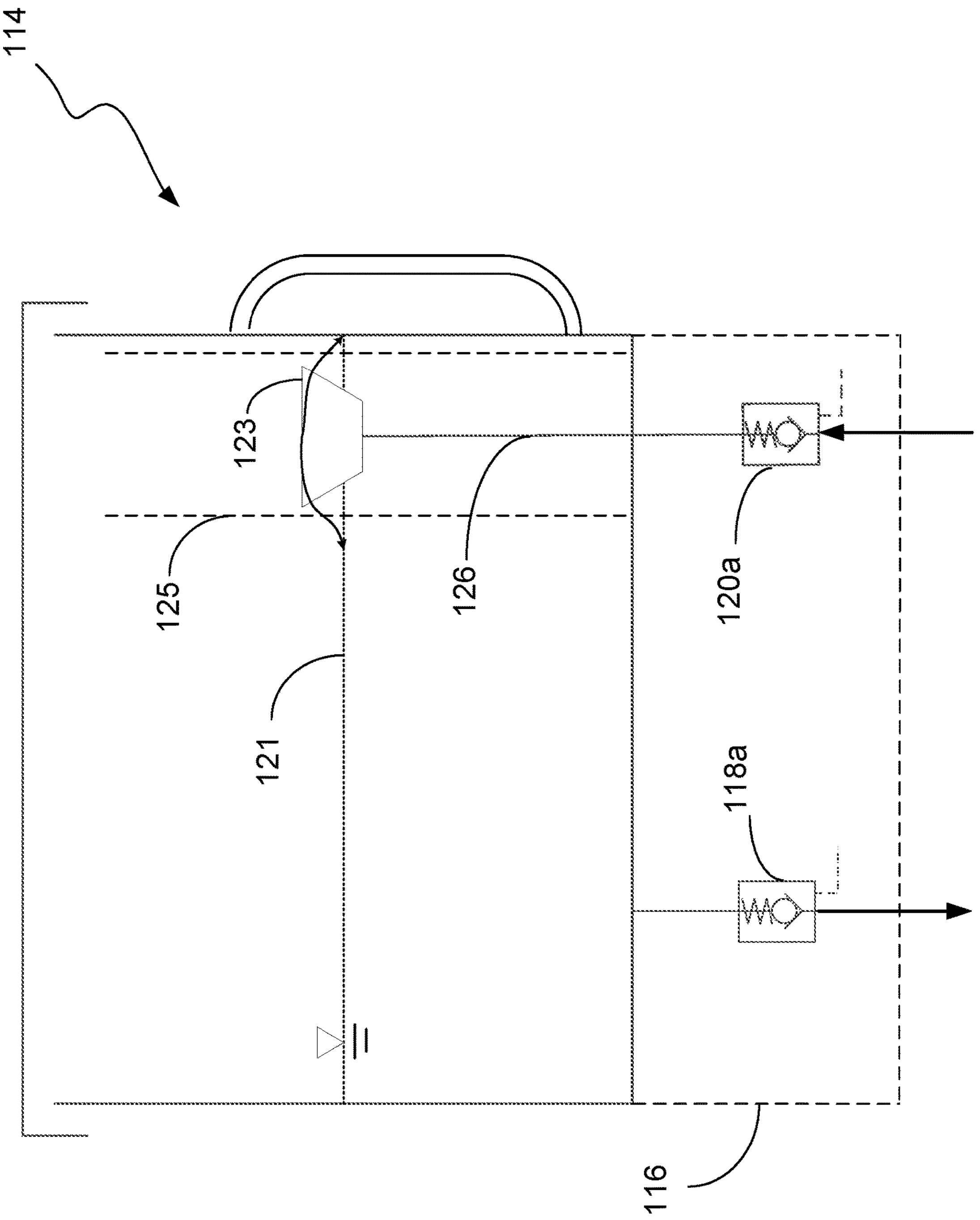
FIG. 4D shows an alternative design for the detachable water reservoir of a carbonation machine with integrated water treatment and an integrated, detachable water reservoir, according to some embodiments of the present invention.

FIG. 4D show an alternative design for the detachable water reservoir of a carbonation machine with integrated water treatment and an integrated, detachable water reservoir, according to some embodiments of the present invention. In this embodiment, water reservoir 114 does not have an upper compartment. Instead, the evacuated stagnant water is diverted back into water reservoir 114 via check valve 120*a* and water return conduit 126 through a floating spill outlet 123, and that is configured such that it may gently spill the returned stagnant water over the surface of the water inside reservoir 114. Because of the temperature difference—the returned stagnant water is expected to be warmer than the cooled water in the reservoir—and provided that returned stagnant water is gently spilled over the surface of the water in the reservoir to avoid any agitation or turbulence within the water in the reservoir, it may be expected to establish stratification with the cooled water in the reservoir forming a first layer and the warmer returned stagnant water forming a second layer, thus effectively fully or greatly maintaining separation of the two layers.

In some embodiments of the present invention, thermal separator 121 (e.g., a meshed sheet made from a thermally insulating material) may be used, that floats on the surface of the water inside water reservoir 114, and physically prevents or greatly reduces mixing of the returned stagnant water that is spilled over the thermal separator with the cooled water underneath it. Separator sheet 121 may be configured to provide effective thermal stratification, by delaying mixing of the returned stagnant water with the cooled water in the water reservoir 114.

Floating spill outlet 123 may be designed in the form of a funnel with the broader rim on top, so that when water fills the funnel it overflows, spilling the returned water over thermal separator 121. Water return conduit 126 may be surrounded by a perforated column 125 for added sturdiness and create a uniform flow distribution at the higher thermal layer.

Figure 5:
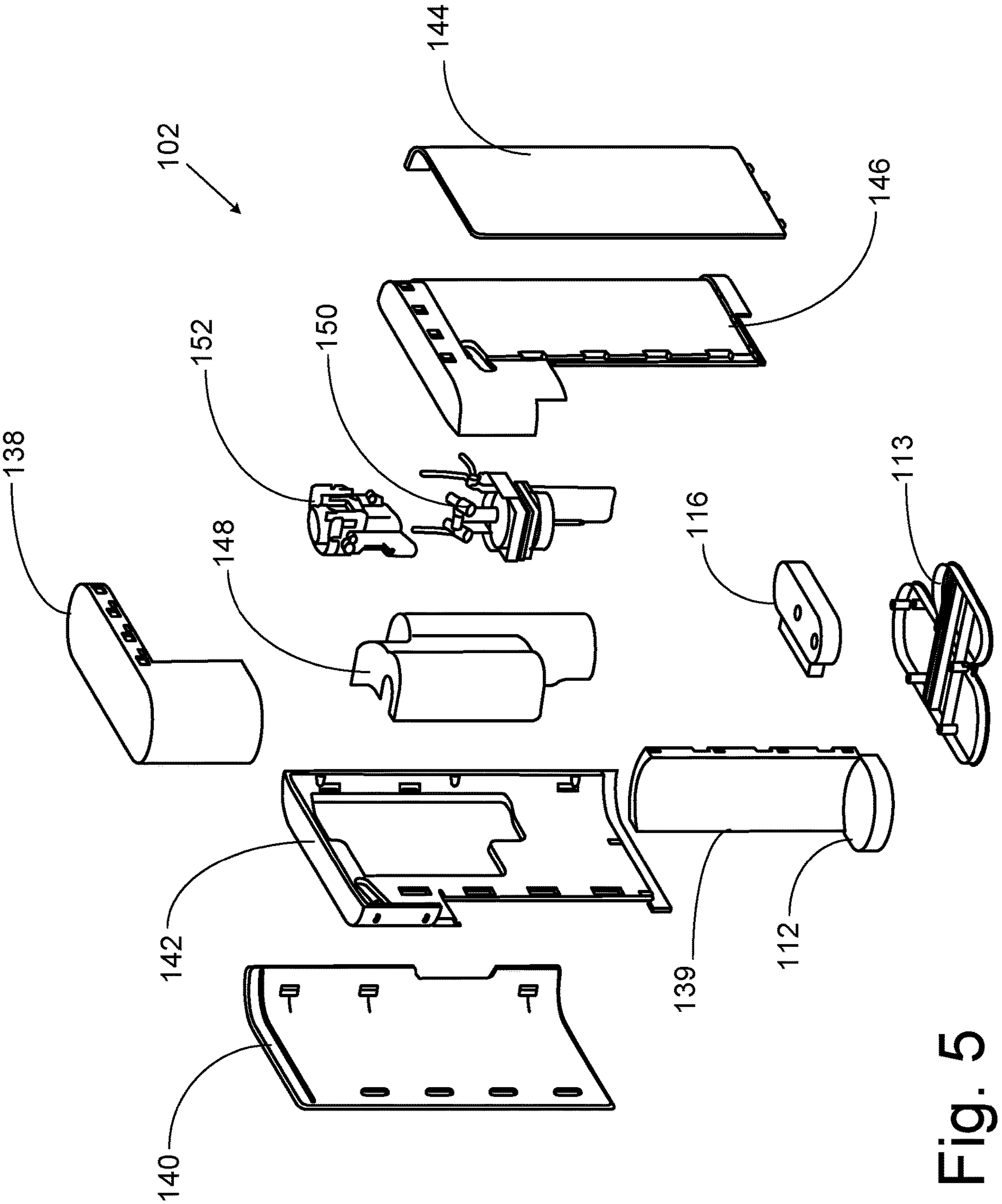
FIG. 5 is an exploded view of a carbonation machine with integrated water treatment, according to some embodiments of the present invention.

FIG. 5 is an exploded view of a carbonation machine with integrated water treatment, according to some embodiments of the present invention.

Carbonation machine 100 may include left wall 142 and right wall 146, left cover 140, right cover 144, top cover 138, front cover 139, inner cover 148, all forming housing 102. Within the housing are located gas canister holder 152 and carbonation head 150. Base bottom 113 closes the housing at the bottom and extends laterally to support reservoir base 116.

Figure 6:
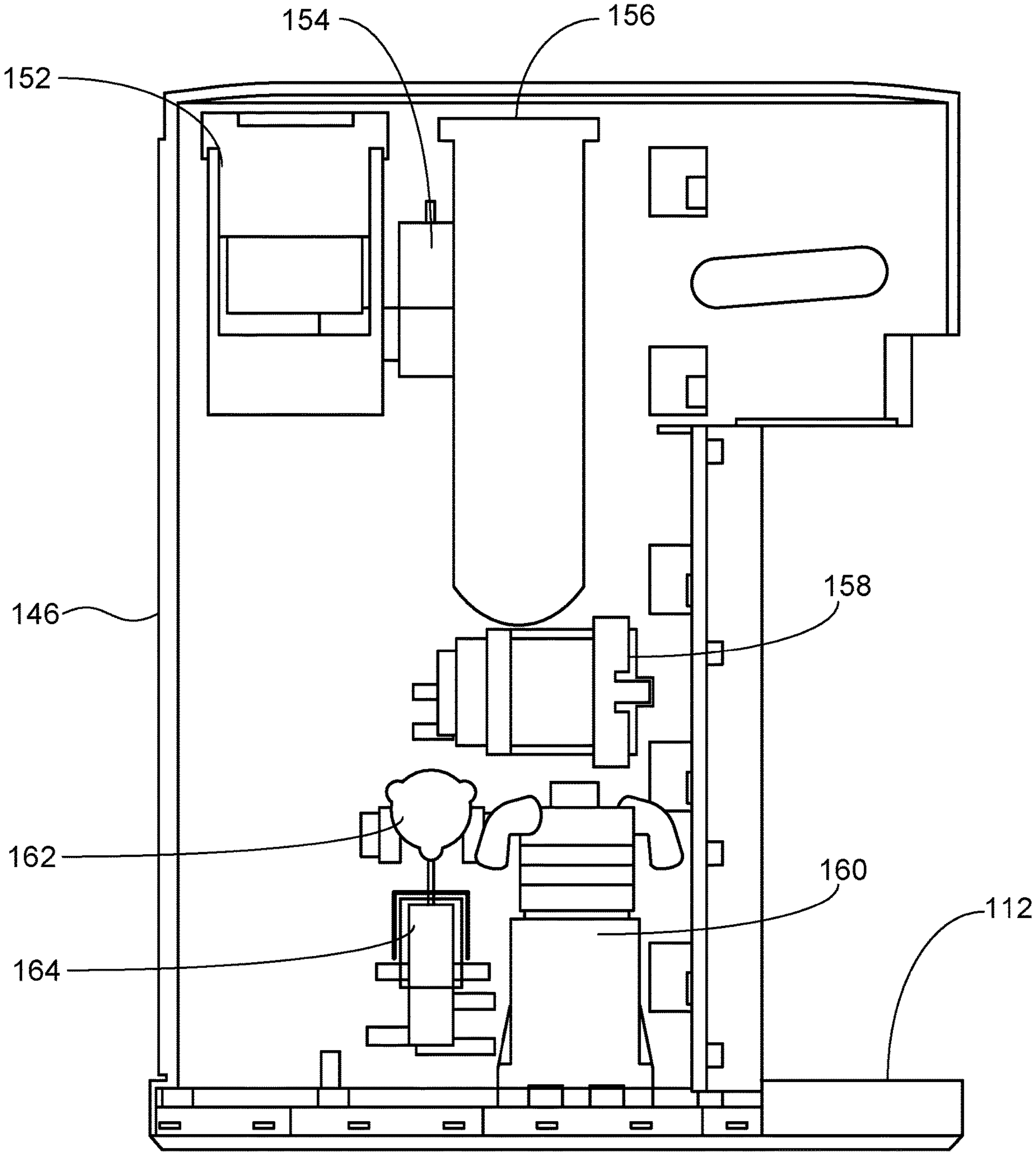
FIG. 6 is a cross-sectional view of a carbonation machine with integrated water treatment and an integrated, detachable water reservoir, according to some embodiments of the present invention.

FIG. 6 is a sectional view of a carbonation machine with integrated water treatment and an integrated, detachable water reservoir, according to some embodiments of the present invention.

Shown in this view are gas canister holder 152, air pump 154, filter 156, UV LED 158, water pump 160, flow meter 162 and three-way valve 164. Connecting piping is not shown, for brevity.

Figure 7:
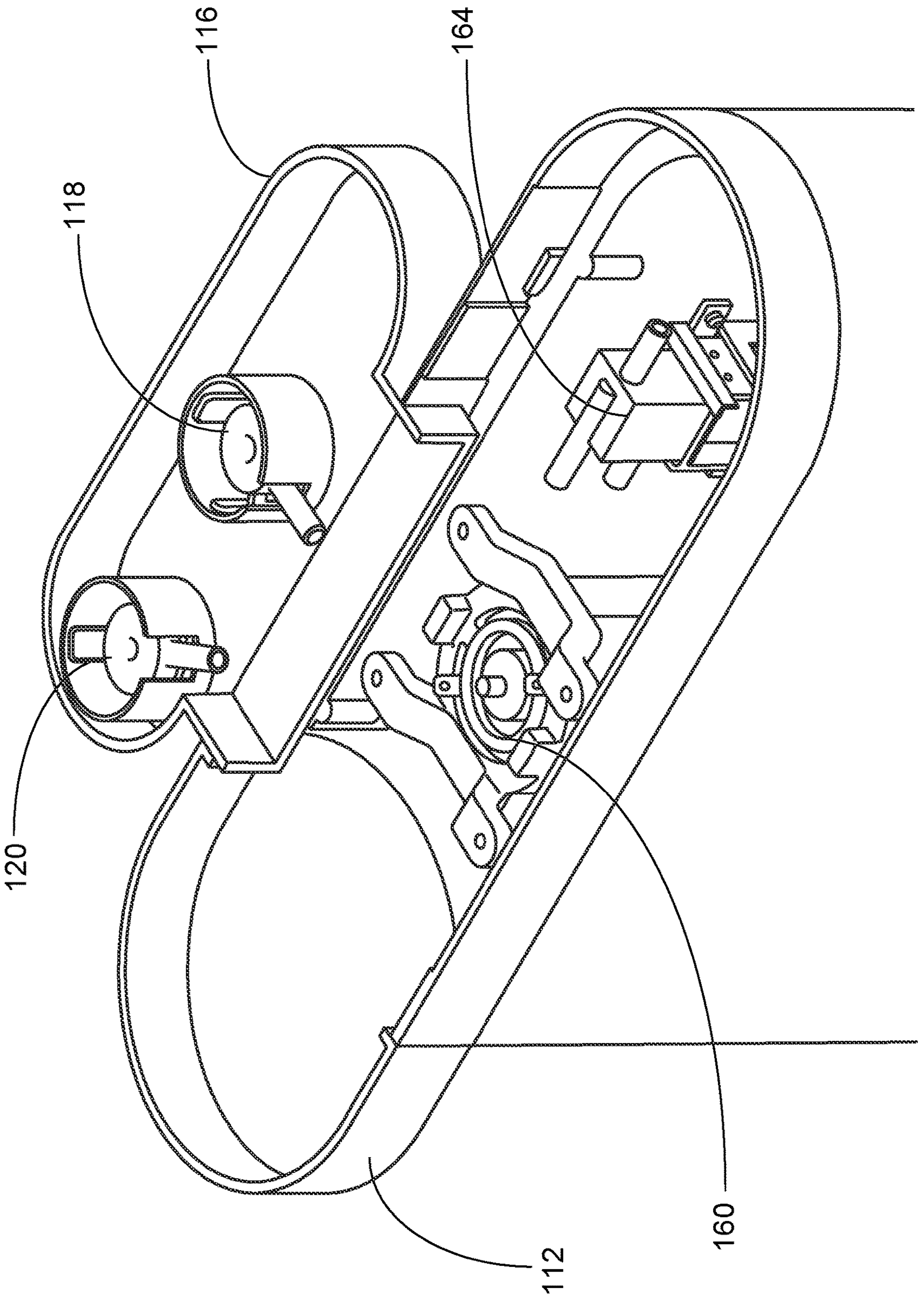
FIG. 7 is a bottom view of a carbonation machine with integrated water treatment and an integrated, detachable water reservoir, according to some embodiments of the present invention.

FIG. 7 is a bottom view of a carbonation machine with integrated water treatment and an integrated, detachable water reservoir, according to some embodiments of the present invention.

Shown in this view are the bottom of water pump 160, three-way valve 164, and reservoir base 116, with outlet port 118 and inlet port 120.

Following is an index of elements shown in the figures:

100—carbonation machine with integrated water treatment and integrated detachable water treatment reservoir;
102—housing;
104—operating button;
106—carbonation head mount;
108—carbonation tube;
110—bottle;
112—base;
113—base bottom;
114—water reservoir;
114*a*—returned water collector;
116—reservoir base;
118—outlet port;
118*a*—check valve;
120—inlet port;
120*a*—check valve;
121—thermal separator;
122—pillar clip;
123—floating spill outlet;
124—handle;
125—perforated column;
126—water return conduit;
127—nozzle;
128—water tank;
130—upper compartment;
130*a*—main filling passage;
130*b*—peripheral container;
131—drain;
131*a*—pinholes;
132—cover;
133—filling opening;
134—filling lid;
136*a*, 136*b*—small bottle and large bottle water level indicators;
138—top cover;
139—front cover;
140—left cover;
142—left wall;
144—right cover;
146—right wall;
148—inner cover;
150—carbonating head;
152—gas canister holder;
154—air pump;
156—filter;
158—UV LED;
160—water pump;
162—flow meter;
164—three-way valve;
165—water piping;
166—pressure release valve;
167—carbonation piping;
168—compressed air (pneumatic);
169—return piping;
170—piston;
172—gas canister;
173—bottle piping;
174—gas canister actuator;
175—control valve;
176—first pressure release valve;
178—second pressure release valve;
180—burst disk;
182—controller.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A carbonation machine with integrated water treatment comprising:
- a carbonation system for carbonating water in a bottle attached to a carbonation head of the system;
- a detachable water reservoir, configured to be mounted on a base with an outlet port to allow outward flow of water from the reservoir;
- piping connecting the outlet port of the water reservoir to transfer water from the detachable reservoir and to pour the water into the bottle;
- a pump for pumping water out of the water reservoir and transfer the pumped water via the piping;
- a controller configured to control the pump; and
  - one or more water treatment components fluidically connected to the piping to apply water treatment to water flowing through the piping, wherein the carbonation machine further comprises one or more valves adjustable between a first position in which stagnant water within the piping is diverted via a water return conduit and evacuated and a second position in which water from the water reservoir is transported via the piping into the bottle, and
  - wherein said one or more valves is configured, when in the first position, to divert the stagnant water back into the water reservoir, and
  - wherein the water reservoir comprises an upper compartment into which the stagnant water is diverted and a drain for draining water from the upper compartment into a tank of the water reservoir.

2. The carbonation machine of claim 1, wherein the piping is located within a housing with the carbonation system.

3. The carbonation machine of claim 1, wherein said one or more water treatment components comprises one or more components selected from the group consisting of: a filter and a UV LED.

4. The carbonation machine of claim 1, wherein the controller is configured to switch said one or more valves between the first position and the second position when a condition is met.

5. The carbonation machine of claim 4, wherein the condition is selected from the group of conditions consisting of: a predetermined duration of time has passed and a predetermined volume of water was determined to have passed through the piping.

6. The carbonation machine of claim 1, wherein the water reservoir comprises an upper compartment into which the stagnant water is diverted to, and a drain for draining water from the upper compartment down into a tank of the water reservoir.

7. The carbonation machine of claim 6, wherein the upper compartment comprises a main filling passage to pour water directly into the tank, and a peripheral container into which the stagnant water is diverted to, the peripheral container including the drain.

8. The carbonation machine of claim 7, wherein the drain comprises one or more pinholes.

9. The carbonation machine of claim 8, wherein an overall area of the drain is not greater than 20 $mm^2$, wherein said one or more pinholes comprises one pinhole having a diameter of up to 5 mm, or several pinholes with matched diameters.

10. The carbonation machine of claim 8, wherein an overall area of the drain is not greater than 10 $mm^2$, wherein said one or more pinholes comprises one pinhole having a diameter of up to 3.6 mm, or several pinholes with matched diameters.

11. The carbonation machine of claim 7, wherein a filling opening of the upper compartment substantially overlap only the main filling passage.

12. The carbonation machine of claim 6, wherein the base comprises an inlet port through which the diverted water is transported.

13. The carbonation machine of claim 6, wherein an outlet check valve is provided at an outlet of the water reservoir, configured to be closed as a default and to be opened when the water reservoir is placed on the base.

14. The carbonation machine of claim 13, wherein an inlet check valve is provided at an inlet of the water reservoir, configured to be closed as a default and to be opened when the water reservoir is placed on the base.

15. The carbonation machine of claim 1, further comprising a floating spill outlet configured to spill returned stagnant water over a surface of water inside the water reservoir.

16. The carbonation machine of claim 15, further comprising a thermal separator for placing over the surface of the water inside the water reservoir.

17. The carbonation machine of claim 16, wherein the thermal separator is made of a thermally insulating material.

18. The carbonation machine of claim 1, further comprising a flow meter along the piping.

19. The carbonation machine of claim 1, wherein the carbonation system comprises a carbonation head to which the bottle is to be attached.

20. The carbonation machine of claim 19, wherein the carbonation head comprises a mount for attaching the bottle.

21. The carbonation machine of claim 19, wherein the carbonation head comprises a tube for transferring carbonation gas into the bottle.

22. The carbonation machine of claim 1, wherein the carbonation system comprises a gas canister holder, for holding a gas canister and carbonation piping for transporting carbonating gas from the gas canister into the bottle.

* * * * *